(12) United States Patent
Brisco et al.

(10) Patent No.: US 9,124,437 B2
(45) Date of Patent: Sep. 1, 2015

(54) METHOD AND SYSTEM FOR A HOTEL BASED MEETING AND CONFERENCE COMMUNICATIONS NETWORK

(75) Inventors: Barry Clayton Brisco, Ottawa (CA); Kevin Bidner, Ottawa (CA)

(73) Assignee: The Hotel Communication Network, Inc., Ottawa, Ontario (CA)

( * ) Notice: Subject to any disclaimer, the term of this patent is extended or adjusted under 35 U.S.C. 154(b) by 1498 days.

(21) Appl. No.: 11/818,949

(22) Filed: Oct. 31, 2006

(65) Prior Publication Data

US 2008/0279117 A1    Nov. 13, 2008

(51) Int. Cl.
*H04L 12/28* (2006.01)
*H04L 12/18* (2006.01)
*H04N 7/15* (2006.01)
*H04J 1/16* (2006.01)

(52) U.S. Cl.
CPC .............. *H04L 12/1859* (2013.01); *H04N 7/15* (2013.01)

(58) Field of Classification Search
CPC .. H04M 7/006; H04L 29/06027; H04Q 11/04
USPC .................... 370/252, 329, 386, 401
See application file for complete search history.

(56) References Cited

U.S. PATENT DOCUMENTS

| 5,935,242 | A  | * | 8/1999  | Madany et al. ............... 713/1 |
| 7,269,668 | B2 | * | 9/2007  | Redford et al. ............ 709/227 |
| 7,751,810 | B1 | * | 7/2010  | Bernoske et al. .......... 455/41.2 |
| 2003/0007464 | A1 | * | 1/2003 | Balani .......................... 370/310 |
| 2004/0111360 | A1 | * | 6/2004 | Albanese ........................ 705/38 |
| 2005/0177303 | A1 |   | 8/2005 | Han |
| 2005/0246415 | A1 | * | 11/2005 | Belfiore et al. ............. 709/203 |
| 2005/0283791 | A1 | * | 12/2005 | McCarthy et al. ............... 725/1 |
| 2007/0008987 | A1 | * | 1/2007 | Manion et al. ............... 370/462 |
| 2007/0124762 | A1 | * | 5/2007 | Chickering et al. ........... 725/35 |

\* cited by examiner

*Primary Examiner* — John Pezzlo
(74) *Attorney, Agent, or Firm* — Burns & Levinson LLP; Bruce D. Jobse

(57) ABSTRACT

A method and system for implementation and operation of an interactive communications network for meeting, trade show, convention or conference ("event") organizers and attendees, which is implemented in one or more hotels proximate to the event facilities, with an access device in guest rooms as well as additional implementations for universal access by event attendees, which access provides for real time messaging and on demand information and communications between the organizers and attendees for access to both static and changing information about the event, such as schedules, locations, speakers and other information typically pertinent to event attendees.

19 Claims, 4 Drawing Sheets

Hotel Installation View

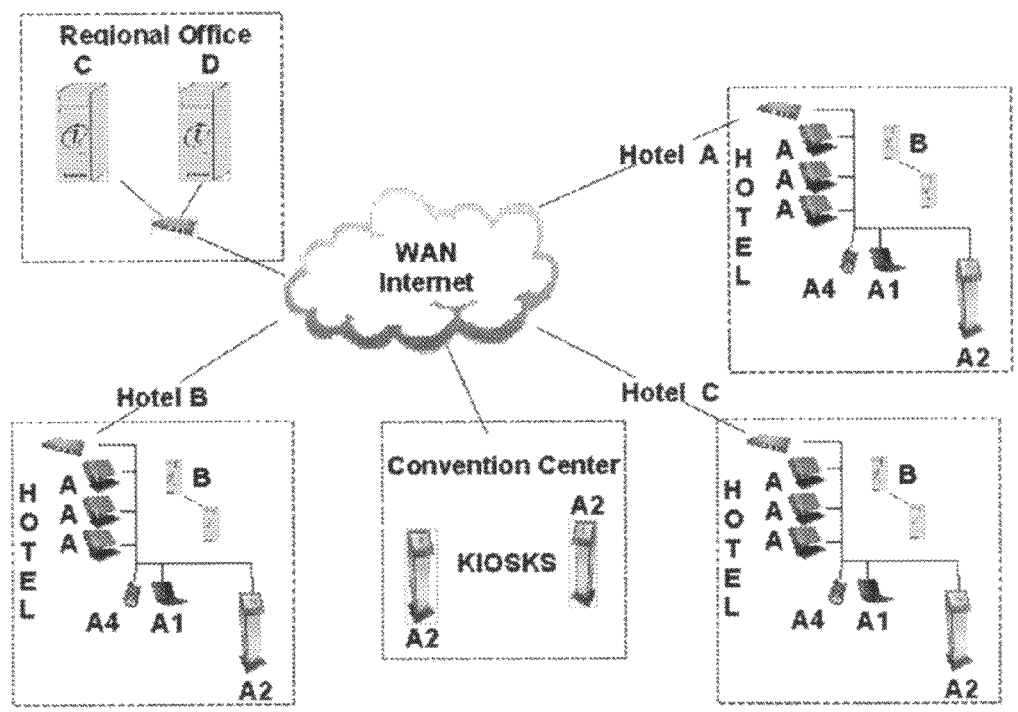
FIG 1 - Total Communications Network View

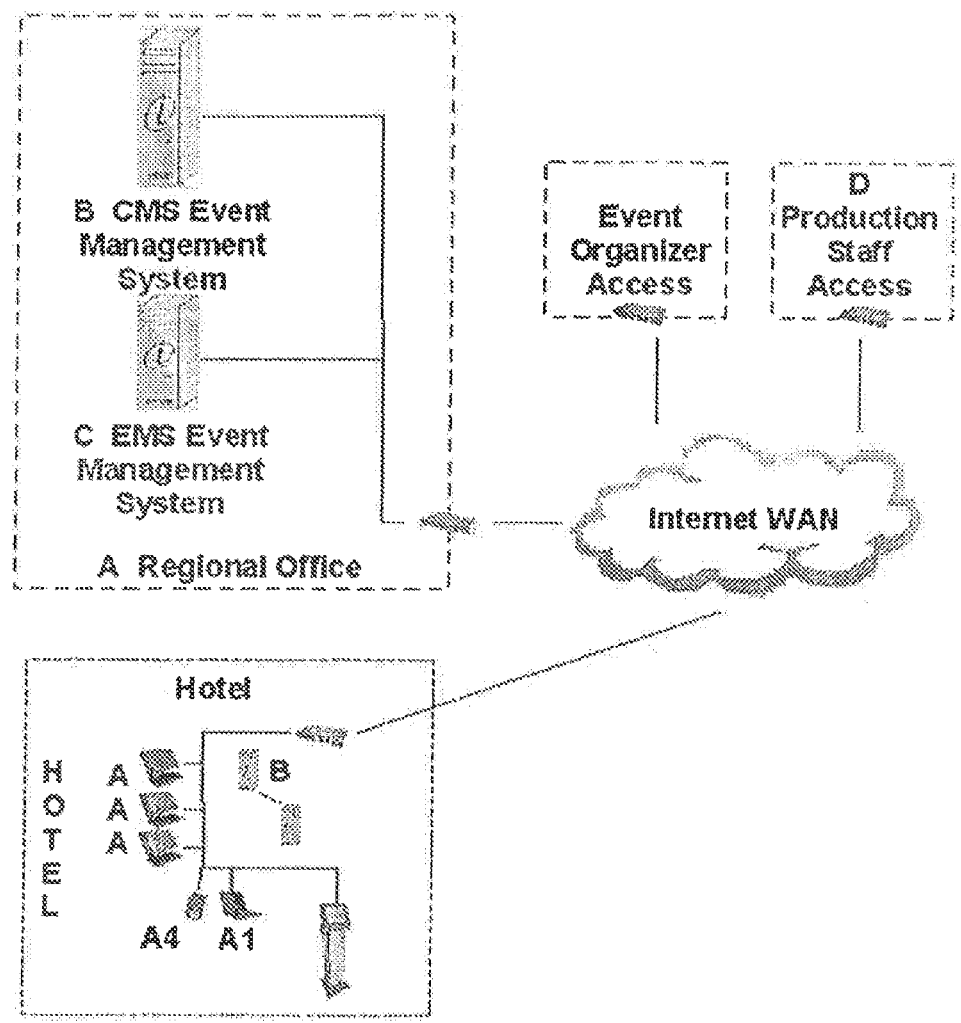
FIG 2 – Regional or Central Office View

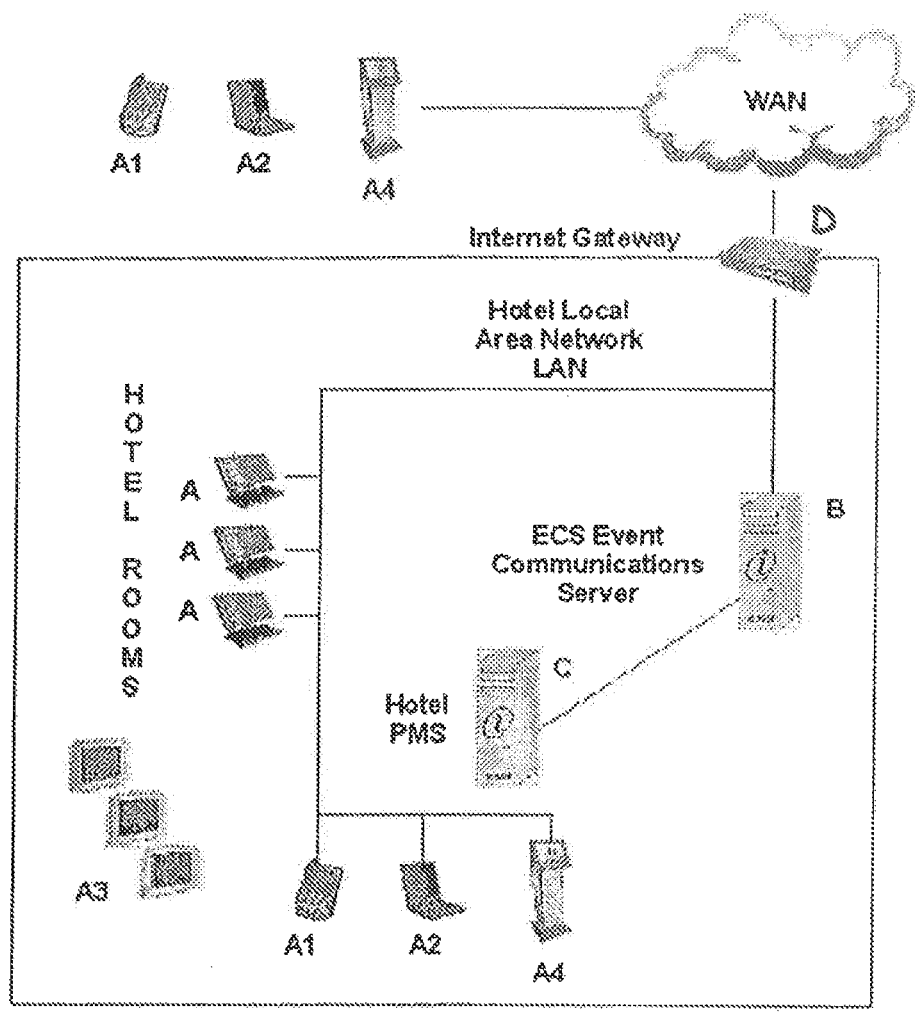
FIG 3 – Hotel Installation View

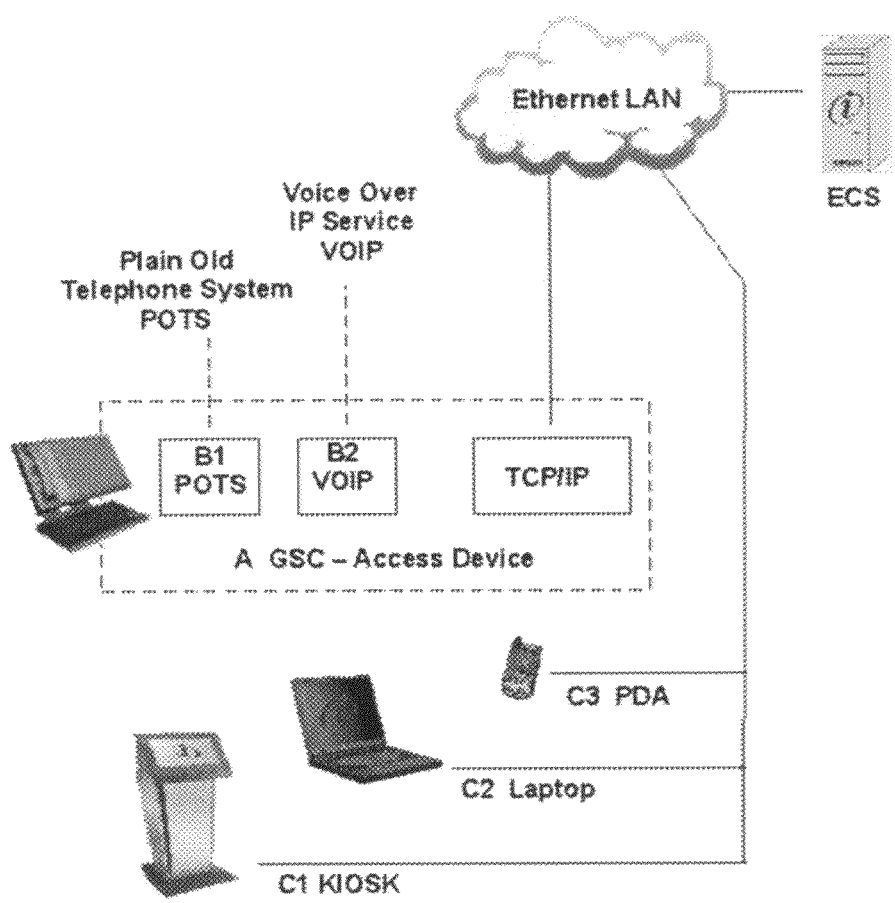
FIG 4 – Access Device View

METHOD AND SYSTEM FOR A HOTEL BASED MEETING AND CONFERENCE COMMUNICATIONS NETWORK

PROBLEM AND UTILITY SERVED

Once attendees to a Meeting, Conference or Convention ("Event") arrive at the city, convention centre, or hotel where the Event is held, it is a difficult, expensive and time intensive task to try to communicate with attendees, to advise them of changes in agenda or location, or remind them of information or highlight information that was published in Event publications before the Event began. Only physically printed information delivered to Hotel rooms by hand, or available at a distant registration area, or a one-way TV broadcast channel for a single Event in a single hotel, or a web-site accessible to those with laptops who know about the web-site and are able to access it, is available.

There are many complicated problems in trying to create a solution to the over-all problem of instant and on demand communications to Event attendees who have traveled to a city to participate in the Event;

1—Normally attendees will be staying in multiple Hotels and not all of the rooms in any Hotel are occupied by attendees to the Event. Each Hotel may have guests attending different Events which are occurring simultaneously, or attending no Event and don't want the intrusion of information about an Event they have no interest in.
2—Many attendees don't have access to a laptop or other computer to access a web-site. Attendees may not know how, where or when to access a web-site.
3—Event information may be time-sensitive and even quite urgent, requiring some method to capture the attention of attendees, whether they are looking for information or not.
4—Event organizers must have an ability to access, initiate and send communications at any time during the Event as unexpected circumstances arise.
5—A solution must be economically viable and must have the capacity and ability to solve the problems beyond a single Hotel, a single Event or even a single city or region.

A communications network, which could be accessed by attendees from their Hotel Rooms with specialized communications device, incorporating real-time voice and data communications, with the capacity to also communicate to a variety of additional devices, channels and locations in proximity to the Event site, with interactive capabilities, as well as the ability to "broadcast messages" to their rooms, available at one or more Hotels patronized by Event participants, would provide organizers and management of the Event with a powerful tool to communicate with Event attendees.

SOLUTION IMPLEMENTATION

The implementation of a solution consists of four components in a highly integrated system, which together create a multi-media communication and information publishing network that is capable of targeting and delivering specific Event information to those Hotel Guests who are participants in the Event. The four components include; a) a communications access device installed in each Hotel Room at or near the Event site ("GIS"), b) a hotel situated meeting & conference communications server which manages the dynamic customization of Event content and communications for each room occupied by a Guest participating in the Event ("MCCS"), c) a content management system implemented in software, which receives Event information provided by the Event organizers and dynamically formats and presents the Event information to the guest on demand in the hotel room ("CMS") and d) an events management system ("EMS") implemented in software, which enables the management and administration of multiple Events in one or more hotels from a remote location.

The GIS consists of a dedicated telephone/computer/network communications device installed in each hotel room, for use and access by guests, where each device is dynamically modified upon check-in by a guest participating in a specified Event, to broadcast Event information and implement interactive menu choices for the guest to select information of interest regarding the Event. Importantly, the GIS is capable or receiving and displaying broadcast messages and rotating banners that could consist of urgent time sensitive information, like schedule changes, seen by the guest whether or not they are looking for information.

The MCCS is installed in one or more hotels close to the Event site and implements communications with the hotel administration and account systems (PMS) to identify which guest participates in which events, to then dynamically reconfigure the content and selections of information displayed and available to the guest in that room.

The CMS is located at a remote central facility, It is used to create and package in modular format, a specialized collection of Event information, using templates and expected Event information applicable to the guest for that Event and has the ability to create content for multiple Events. The CMS can be accessed by Event organizers to supply Event information, including last minute changes or unfolding information during the Event.

The EMS is located in a remote centralized location, like a corporate head office or regional office, has the ability to create and Manage multiple Events, which includes distribution of Event modular packaged information using a communications network, to each applicable Hotel and channel, including the administration of the start, stop, control and audit, and roll-back of each Event in one or more Hotels and multiple Events in one or more Hotels and one or more Regions.

UNIQUE ATTRIBUTES OF THE SOLUTION

The solution includes some unique and not obvious attributes that solve the many problems and challenges. Not all of these attributes are required to implement the solution. The solution allows for the operation of multiple interactive channels so that multiple Events can have their own custom communications network within the Hotel or multiple Hotels at the same time.

1. The solution implements multi-media communications, including standard telephone voice, data such as Intranet and Internet, as well as both batch and real-time communications and transactions.
2. The solution automatically determines which Event a Hotel Guest is participating in and customizes their Communications Access device to access and display the required information for their Event.
3. The solution implements an efficient and cost effective, timely solution by which information published by the Event managers can be transposed and made accessible on demand by the Event participants from their Hotel Room.
4. The solution implements a complete remote management and operations control function, so that multiple Events and multiple Hotels can be operated and managed in the Hotel Room Based Meeting and Convention Communications Network from a single or multiple remote locations.

5. The solution enables Event management to instantly communicate and message to Event participants in their Hotel Rooms through-out the duration of the Event.
6. The solution incorporates Type 2 and Type 3 ISO magnetic card swipe, so that Event participants can authorize and transact within the network on a secure and identity authorized basis.
7. The solution includes a network and server/client/program/data architecture that is a unique combination of decentralized and centralized configuration, to allow for the efficient operation of all services and functions, while ensuring a base availability of service regardless of communications or network outages.

DESCRIPTION OF DRAWINGS

FIG. 1—Total Communications Network View

A) The GIS access device is installed in each Hotel room in each or most of the proximate Hotels to major meeting and conference facilities. A1, A2, A4 represent additional and supplementary access devices and channels, such as guests using laptops, public access kiosks, TV channels and PDA's B) A Meeting Conference Communications Server ("MCCS") is placed in each installed Hotel for the purpose of configuring each GIS access device to access communications for the Event that the guest in that room is attending and to provide distributed information on demand as well as real-time display banner and message communications about the Event.

C) A Content Management System ("CMS") is implemented in a regional or central office facility and is used to collect, format and publish template modules of information for a specific Event.

D) An Event Management System ("EMS") is implemented in a regional or central office facility and is used to communicate and publish contents for each Event to the Hotels and Access devices and channels that are required for that Event.

FIG. 2—Regional or Central Office View

A) The Regional or Central Office Meeting & Conference Communications Network ("MCCN") Center is equipped with high-speed Internet communications and serves as the control, production and communications center for the Network. There may be multiple regional centers which are managed by a Central facility.

B) A Content Management System ("CMS"), implemented by specialized software on computing systems, is equipped with templates and modules that are formatted to reflect the type of communications and information required by usual Meeting and Conference Events. The CMS is used to collect, format for each access device and channel, then modularize multiple information contents for each and multiple events. Event organizers may access their Event to contribute, update and approve content. When completed and approved, content modules for an Event are released to the Event Management System for distribution.

C) An Event Management System ("EMS"), implemented by specialized software on computing systems, is used to communicate and distribute the Content modules for each Event, at a scheduled time, to each Event Communications Server at each Hotel, and in addition to each Access Channel that is internal or external to the Hotel.

D) Production Staff and Management have access to both the CMS and the EMS on either a local or remote basis, for the purpose of producing content, distributing or publishing Event communications and monitoring the operation of the system.

FIG. 3—Hotel Installation View

A) A specialized GIS access device incorporating a telephone, computer, ethernet communications and a large display screen is installed in each room of each installed hotel. Supplementary and additional devices and communication channels (A1, A2, A3, etc.) are installed or connected to the MCCN system. Supplementary and additional devices and channels include guests using laptops to access Internet, Kiosks installed in lobby or other public places, TV channel facilities and guest PDA devices.

B) An Event Conference Communications Server ("ECCS") is installed in each installed Hotel. The ECCS receives active scheduled Event information and content and implements and manages specific Event communications to each GIS, by configuring the device to access Event communications which the guest in that room is participating in. The ECCS transfers logo's, labels, menu choices, pointers, automatic display banners and real-time messages to the GIS. The ECCS also serves as a host for storage of Event communications information. Upon completion of the Event, the ECCS must reverse configure each GIS to it's original state. The ECCS must manage multiple Events and determine which room guest in which room is a participant of which Event, either by receipt of guest check-in information from the PMS or by dynamic guest selection from a list of active events.

C) The Hotel's PMS (Guest Folio Account) resident within the Hotel or a remote location has a communications connection to the ECCS.

D) Internet connectivity to each guest room, for laptop access to Internet by guests, is used as the network communications channel, by the ECCS to each GIS and by the GIS to Internet services FIG. 4—Access Device View A) The specialized GIS access device installed in each guest room of each installed hotel includes resident memory and software applications that enable a client server facility with the ECCS system located on the Hotel property. The ECCS transmits Event control parameters to be stored on the GIS, including Event ID tags, labels, menu choices, rotating banners and other Event content that will enable the guest in that room participating in the specific event, to see broadcast Event information if they are present in the room and on demand, access more information on an interactive basis. All Event specific information and control parameters are removed from the GIS when the Event is finished or if the guest checks out, so that a subsequent guest does not have access to Event information.

B) The GIS incorporates a standard telephone, a VOIP telephone, a computing facility and Ethernet/internet connections so that both voice and data communications can be used to deliver Event communications to the guest.

C) Supplementary and additional devices and channels, which are installed and resident at the Hotel or which are specifically used by Hotel guests, are also configured, managed and included in the MCCN system by the ECCS. Kiosks, guest laptops and guest PDA's are all examples.

We claim:

1. A system for providing an interactive communications network interface through which event organizers, suppliers, sponsors or attendees can communicate information related to an event, comprising:

an event management module configured to:
  receive event related information associated with at least one event provided by at least one event organizer;
  receive guest information associated with a guest of a hotel;
  determine one or more events being attended by the guest during the guest's stay at the hotel from hotel PMS system check-in records indicating that a guest has checked into one of a plurality of guest rooms;
  determine if the guest has checked in to the hotel;
  upon determining that the guest has checked in to a guest room of the hotel, identify the guest room associated with the guest and a communications access device associated with the guest;
  automatically configure the identified communications access device to receive guest-specific event related information corresponding to the events being attended by the guest; and
  provide the guest-specific event related information to the identified communications access device; and
a plurality of communications access devices in communication with the event management module, each of the a plurality of communications access devices installed in one of a plurality of separate guest rooms of the hotel and associated with one of a plurality of guests and configured to:
  receive the event related information from the event management module,
  present the event related information associated with the one or more events being attended by the guest associated with the respective communications access device in the guest room, and
  enable the guest to interact with the communications access device to access guest-specific additional information associated with the events being attended by the guest on an interactive basis.

2. The system of claim 1, wherein the communications access device is a personal communication device associated with the attendee that is configured to present personalized event related information associated with an event being attended by the attendee.

3. The system of claim 1, further comprising:
a content management module configured to receive the event related information associated with the event from any of an event organizer, supplier or sponsor, format the received event related information to a format acceptable by the event management module, and present the formatted event related information to the event management module for distribution to the communications access device.

4. The system of claim 1, wherein the communications access device comprises an output component for presenting the event-related information to the attendee and an input component for receiving an input from the attendee.

5. The system of claim 4, wherein the output component is at least one of a visual output device or an audio output device and the input component is at least one of a touch screen, a text input device, or a pointing device.

6. The system of claim 4, wherein the communications access device comprises a card reader that is configured to receive attendee-related information from a card associated with the attendee, wherein the attendee-related information includes at least one of authentication information, purchasing information, or age verification information associated with the attendee.

7. The system of claim 1, wherein the communications access device is communicatively coupled to a hotel property management system having guest identification information, comprising group and event affiliation.

8. The system of claim 7, wherein the event management module is configured to communicate with the communications access device via a hotel-specific content distribution module communicatively coupled to the hotel property management system and configured to receive the event related information from the event management module, and distribute, to the communications access device, the event related information corresponding to events being attended by the attendee.

9. The system of claim 1, wherein the event management module is further configured to:
determine if the guest has checked out of the hotel; and
upon determining that the guest has checked out of the hotel, reverse configure the identified communications access device to its original state.

10. The system of claim 1, wherein the event management module is configured to determine if the guest has checked in to the hotel by receiving receipt of guest check-in information from a hotel management system communicatively coupled to the event management module.

11. The system of claim 10, wherein the event management module and the hotel management system are both located on site at the hotel at which the guest is staying.

12. A computer-implemented method for providing an interactive communications network interface to attendees to an event, comprising:
A) maintaining a plurality of configurable communication devices, each of the plurality of communications devices installed in one of a plurality of separate guest rooms of a hotel;
B) receiving, with an event management server operatively coupled over a network to a source, event related information associated with at least one event;
C) maintaining in memory data associating selected of the plurality of separate guest rooms with guests attending at least one event;
D) receiving information from hotel PMS system check-in records indicating that a guest has checked into or out of one of the plurality of separate guest rooms;
E) automatically configuring the communications device in one of the plurality of guest room associated with a guest attending the at least one event to receive event related information, once information is received from the hotel PMS system indicating that a guest has checked into the guest room; and
F) automatically reconfiguring the communications device in the guest room associated with a guest attending the at least one event to no longer receive event related information upon the occurrence of the predetermined threshold.

13. The method of claim 12 wherein the predefined thresholds comprises receiving data indicating termination of the event.

14. The method of claim 12 wherein the predefined thresholds comprises receiving data from the hotel folio system indicating that a guest has checked out of the guest room.

15. The method of claim 12 further comprising:
G) enabling a guest to interact with the communications device to access additional information associated with the at least on event on an interactive basis.

16. A system for providing an interactive communications network interface to attendees to an event, comprising:
a plurality of configurable communication devices, each of the plurality of communications devices installed in one of a plurality of separate guest rooms of a hotel;

an event management server operatively coupled to each of the plurality of configurable communication devices and to a hotel PMS system and further configured to:
receive event related information associated with at least one event from a source over a network;
maintain in memory data associating selected of the plurality of separate guest rooms with a guest attending at least one event;
receive information from the hotel PMS system check-in records indicating that a guest has checked into or out of one of the plurality of separate guest rooms;
automatically configure the communications device in one of the plurality of guest room associated with a guest attending the at least one event to receive event related information, once information is received from the hotel PMS system check-in records indicating that a guest has checked into the guest room; and
automatically reconfigure the communications device in the guest room associated with a guest attending at least one event to no longer receive event related information upon the occurrence of a predetermined threshold.

17. The system of claim 16 wherein the predefined thresholds comprises receiving data indicating termination of the event.

18. The system of claim 16 wherein the predefined thresholds comprises receiving data from the hotel folio system indicating that a guest has checked out of the guest room.

19. The system of claim 16 wherein the event management server is further configured to:
enable a guest to interact with the communications device to access additional information associated with the at least on event on an interactive basis.

* * * * *